United States Patent [19]

Giles, Jr. et al.

[11] Patent Number: 4,543,292

[45] Date of Patent: Sep. 24, 1985

[54] MULTILAYER STRUCTURE

[75] Inventors: Harold F. Giles, Jr., Cheshire; Lorene E. Baccaro, Dalton, both of Mass.

[73] Assignee: General Electric Company, Mt. Vernon, Ind.

[21] Appl. No.: 680,967

[22] Filed: Dec. 12, 1984

[51] Int. Cl.$^4$ ............................................. B32B 27/36
[52] U.S. Cl. .................................... 428/412; 428/483; 428/516; 525/67; 525/92; 525/146
[58] Field of Search ...................... 428/412, 516, 483; 525/146, 67, 92; 260/557; 156/244.11

[56] References Cited

U.S. PATENT DOCUMENTS 4,339,502  7/1982  Gerry et al. ...................... 428/412

Primary Examiner—Theodore E. Pertilla
Attorney, Agent, or Firm—Martin B. Barancik

[57] ABSTRACT

A multilayer structure comprising an outer layer of aromatic polycarbonate and an outer layer of a polyolefin, said outer layers tied together with a layer comprising an admixture of a polyolefin and a polyalkylene terephthalate, the polyalkylene terephthalate present in said quantities in the tie layer so as to provide adhesion between the outer layers.

9 Claims, No Drawings

MULTILAYER STRUCTURE

BACKGROUND OF THE INVENTION

Multilayer compositions have been utilized for many years. The concept of a multilayer is that the positive properties of two or more materials are combined with the structural integrity of each material being essentially uncompromised. Usually the positive properties of one material off-set or counter balance the weaker properties of the second material. For example, among the positive properties of polycarbonate are high heat resistance and impact strength. However polycarbonate has a relatively high transmission rate for certain gases, oxygen and carbon dioxide for example. Polyvinyl chloride does not have very high resistance to impact or heat but has excellent resistance to the transmission of oxygen and carbon dioxide. Therefore a multilayer composition utilizing polycarbonate adjacent to polyvinylchloride can be employed in structures wherein the properties of high impact resistance, high heat resistance and high resistance to oxygen and carbon dioxide transmission are necessary.

Although many of these multilayer compositions can be hypothesized on the basis of laminating a material possessing certain strong properties with a material having weaknesses in those same property areas, certain practical considerations inhibit successful implementation of this theory. The two materials are in intimate contact at their interface. This juncture or interface should provide a sufficiently strong interaction with respect to the processing conditions which the multilayer structure undergoes that a tight, firm bond is maintained. Such conditions to which the multilayer can be exposed include heat, pressure, humidity, liquid chemicals, gases and the like or various combinations of these conditions. The propensity of the two layers to maintain this tight, firm bond is generally known as the "compatibility" of the two layers. When the two materials are incompatible, the utility of the multilayer structure is severely inhibited or useless. In order to bind two relatively incompatible layers, a tie layer is generally employed joining the two incompatible layers by "tieing" them together. This tie layer usually enjoys good compatibility with both incompatible layers and is aligned between the two incompatible layers.

Aromatic polycarbonate is a particularly useful material for multilayer technology because of its high heat and impact resistance. However, it is incompatible to a varying degree with a number of other resins. Of particular concern is its incompatibility with olefin containing resins.

A tie material which is particularly effective for tieing aromatic polycarbonate with olefin containing polymers has been discovered. This tie layer can provide a multilayer structure which has the additional advantage of stability at relatively high temperatures as measured by its resistance to peeling into separate layers.

DESCRIPTION OF THE INVENTION

In accordance with the invention there is a multilayer structure comprising an outer layer of aromatic polycarbonate and an outer layer of a polyolefin tied together with a layer comprising an intimate admixture of a polyolefin and a polyalkylene terephthalate, the polyalkylene terephthalate present in such quantities in the tie layer so as to provide adhesion between the outer layers.

A further aspect of the invention is a composition comprising an intimate admixture of
 (a) a major amount of an aromatic polycarbonate and a polyolefin and
 (b) a minor amount of a polyalkylene terephthalate.

Aromatic polycarbonates are prepared in the conventional manner by reacting a dihydric phenol with a carbonate precursor in an interfacial polymerization process or transesterification. Typical of some of the dihydric phenols that may be employed in the practice of this invention are 2,2-bis(4-hydroxyphenyl)propane (bisphenol-A), (2,2-bis(4-hydroxy-3-methylphenyl)propane, 4,4-bis(4-hydroxyphenyl)heptane, 2-2(3,5,3', 5'-tetrachloro-4,4'-dihydroxydiphenyl)propane, 2,2-(3,5,3', 5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishaloformates of ethylene glycol, neopentyl glycol, polyethylene glycol, etc.). While other carbonate precursors will occur to those skilled in the art, carbonyl chloride, also known as phosgene, is preferred.

The aromatic polycarbonates of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of aromatic polycarbonates are also copolyestercarbonates, that is the polymer made from a dihydric phenol, a dibasic acid and a phosgene precursor. U.S. Pat. No. 3,169,121 covering copolyestercarbonates and methods of preparing them is hereby incorporated by reference.

The other "outer" layer in the multilayer structure is a polyolefin. Typical of the polyolefins are polyethylene, polypropylene, polybutylene, polyisobutylene or any of the olefin monomers having from two to about ten carbon atoms, inclusive, preferably from two to about eight carbon atoms, inclusive. Copolymers of the above may be employed, and are included within the term polyolefin. Examples of copolymers include copolymers of ethylene and propylene or ethylene and butene. The term copolymers includes the usual copolymers, that is, random, random block and block copolymers. Various densities of polyolefins can be employed in this invention and include high density polyethylene, linear low density polyethylene and low density polyethylene. The preferred polyolefin is polypropylene.

The internal tie layer joining together the aromatic polycarbonate and the polyolefin outer layers is an admixture of a polyolefin and polyalkylene terephthalate. The polyolefin employed is any of the polyolefins previously mentioned. However a polyolefin having a monomer of two to four carbon atoms is generally employed. Polypropylene is preferred. The alkylene grouping of the polyalkylene terephthalate is generally two to four carbon atoms in length, that is ethylene, propylene or butylene. The preferred polyalkylene terephthalate is polybutylene terephthalate.

The quantity of polyalkylene terephthalate to polyolefin in the tie layer can vary significantly and still retain the excellent characteristics of adhesiveness and preferably the high temperature stability observed. Generally, a minimum weight percent of about 30% of polyalkylene terephthalate is necessary, the 100 weight percent measured as polyalkylene terephthalate and polyolefin. The strength of the tie layer is somewhat reduced above about a weight percent of 70% polyalkylene terephthalate. Ranges of polyalkylene terephthalate as weight percent of polyalkylene terephthalate and polyolefin are preferably from about 45% to about 55%.

The multilayer structures can be readily prepared by standard techniques, including co-extrusion through a feedblock or combination in the die. The thickness of the layers may vary substantially and are obviously somewhat dependent upon the final use to which the multilayer structure will be applied. Generally from about 0.25 mil to about 60 mil thickness of each outer layer can be employed. The layers, however, are preferably from about 0.5 to 30 mil. The tie layer is usually significantly thinner than the outer layer. Normally the tie layer will be thinner than 1 mil. Tie layers of up to 5 mil can also be employed.

With reference to the outer layer, it need not be the final outer layer of the structure. It is only "outer" with respect to the tie layer. Each of the aromatic polycarbonate and polyolefin layers may also be adjacent to layers of other polymers or even a thin metal strip. For example, a five layer structure of, in order, polycarbonate-tie-polypropylene-tie-polycarbonate is readily prepared. The tie layer comprises a polyolefin and a polyalkylene terephthalate.

The multilayer structure may comprise a simple laminate useful, for example, as a tray or can be thermoformed or blow-molded into a variety of structures including containers of various types.

In preparing laminates or containers of the invention, there can be significant wasteage of the multilayer material. An example of such material is the scrap material prepared when the pinch-off is made in co-extrusion blow molding. A further example of such material is containers of the multilayer material which have outlived their usefulness. These multilayer scrap materials are reground thus forming a blend of their components. The outer layers, i.e. the polycarbonate and the polyolefin are a major weight percent of the blend, generally above about 70 weight percent, preferably above about 85 weight percent of the blend. The tie layer will be a minor amount of the blend. In the reground materials of this invention, the polyalkylene terephthalate is a minor weight percent of the admixture, the polyolefin of the tie layer being measured as a portion of the polyolefin accounting for a major portion of the admixture.

The admixture can be injection molded into various parts and utilized wherein an aromatic polycarbonate can be employed. The admixture of aromatic polycarbonate, polyolefin(s) and polyalkylene terephthalate demonstrates better chemical resistance than polycarbonate alone.

Below are examples of the invention. They are intended to exemplify the broad nature of the invention rather than be restrictive of the broad concept.

Samples for Instron testing were prepared by extruding 1-4 mil films of LEXAN ® 101, bisphenol-A polycarbonate, polypropylene (Shell 5550), and blends of VALOX ® 310/polypropylene 5550 (50/50), cutting them into 1 inch×8 inch strips, heat sealing, and pulling on an Instron testing machine.

The films were extruded on a 1.5 inch single screw Killion extruder. The extrusion temperatures were:

LEXAN ®-470/480/490/500/460/460° F.
Polypropylene-330/340/350/360/340/340° F.
PBT/PP-410/420/430/440/400/400° F.

Temperatures are from feed throat to die. The last 2 temperatures are die temperatures.

The 1 inch×8 inch strip laminated samples were heat sealed at 50 psi for 15–20 seconds at 500° F.

Instron pull test conditions—12″/minute crosshead speed measured over 5″ length.

CONTROL

Polycarbonate and polypropylene laminate was prepared with no tie layer. There was no adhesion between the two layers. The sample fell apart while placing into the Instron.

EXAMPLE

The polycarbonate polypropylene laminate was prepared with a 50/50 wt. percent polybutylene terephthalate/polypropylene tie layer.

The three layer laminate had a peel strength of 1.3 #/inch on the Instron.

What is claimed is:

1. A multilayer structure comprising an outer layer of aromatic polycarbonate and an outer layer of a polyolefin, said outer layers tied together with a layer comprising an admixture of a polyolefin and a polyalkylene terephthalate, the polyalkylene terephthalate present in quantities in the tie layer so as to provide adhesion between the outer layers.

2. The structure in accordance with claim 1 wherein the polycarbonate is bisphenol-A polycarbonate.

3. The structure in accordance with claim 1 wherein the polyolefin in the outer layer is polypropylene.

4. The structure in accordance with claim 1 wherein the polyolefin in the tie layer is polypropylene.

5. The structure in accordance with claim 1 wherein the polyalkylene terephthalate is polybutylene terephthalate.

6. The structure in accordance with claim 5 wherein polypropylene is the polyolefin in both the outer and tie layers.

7. The structure in accordance with claim 6 wherein the polycarbonate is bisphenol-A polycarbonate.

8. The structure in accordance with claim 5 wherein the polybutylene terephthalate is from about 30% to about 70% weight percent of the polybutylene terephthalate and polypropylene in the tie layer.

9. The structure in accordance with claim 7 wherein the polybutylene terephthalate is from about 45% to about 55% weight percent of the polybutylene terephthalate and polypropylene in the tie layer.

* * * * *